Feb. 10, 1948. S. ROBAUS 2,435,904
METHOD OF PRODUCING LINED PIPE BENDS
Filed June 13, 1945
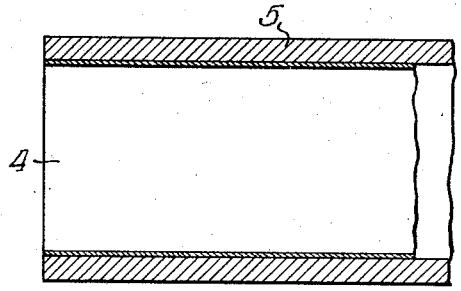
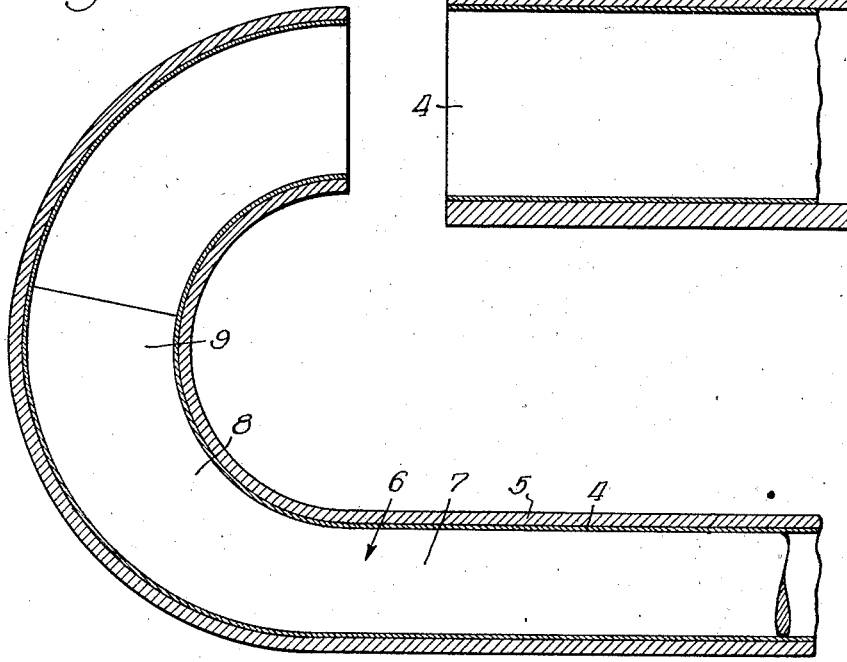
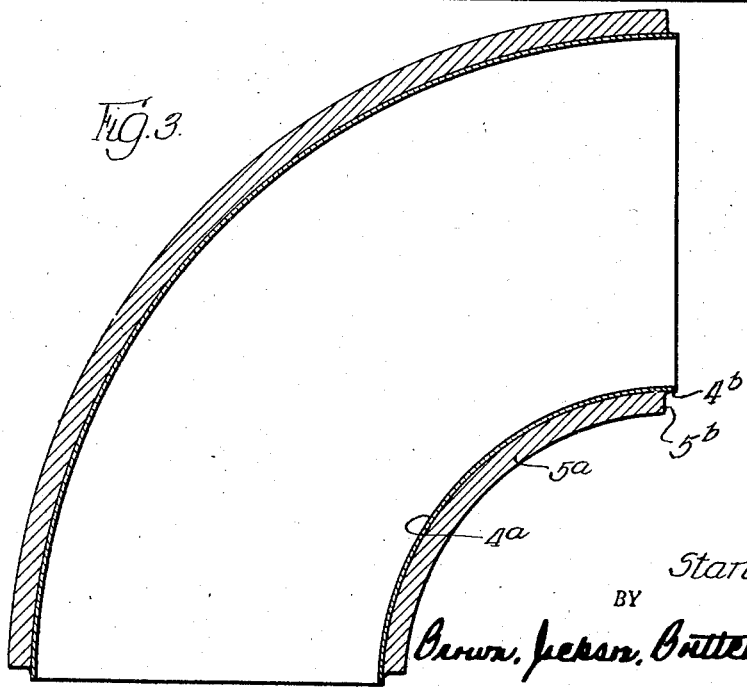
INVENTOR.
Stanley Robaus,
BY
*Brown, Jackson, Boettcher & Dienner*
ATTYS.

Patented Feb. 10, 1948

2,435,904

UNITED STATES PATENT OFFICE 2,435,904

METHOD OF PRODUCING LINED PIPE BENDS

Stanley Robaus, Cicero, Ill., assignor to Taylor Forge & Pipe Works, Cicero, Ill., a corporation of Illinois Application June 13, 1945, Serial No. 599,187

2 Claims. (Cl. 29—157)

This invention relates to pipe bends and has to do with the production of lined pipe bends.

In carrying out chemical processes, and in the treatment of certain food products, such as milk, it is of importance that the pipes or conduits through which the materials being processed pass be resistant to such materials. To that end, it is known to provide pipe of a metal which would be attacked by the materials being processed, these pipes having therein liners of metal dissimilar to that of the pipe and which will not be attacked by the materials being processed. It is of importance that the liner fit snugly the interior of the pipe, particularly in cases where high pressures are encountered, so as to be backed effectively thereby. In a line of piping there usually is present a considerable number of elbows or bends. It is of particular importance, in a line of piping used for handling materials of the character referred to, that the lining of the elbows or bends fit tightly the interior thereof, since there is risk, at the junctures between the bend and the ends of the straight run of pipe, that a certain amount of the material may enter between the parts. If the lining of the elbow is not fitted to the interior thereof so as to provide a substantially fluid-tight seal therewith, the material may enter between the elbow and its lining and attack the outer wall of the elbow.

It is quite difficult to insert into a pipe bend, such as an elbow, a lining, and to attain an accurate fit between the lining and the elbow throughout the full extent thereof, particularly at the ends of the elbow, while also assuring that the lining will fit within the elbow so tightly as to provide a substantially fluid-tight seal therebetween. My invention is directed to the method whereby a pipe bend, such as an elbow, may be produced with the lining fitting within the elbow accurately throughout its full extent and in tight sealing contact therewith. More specifically, I provide a cylindrical pipe straight lengthwise with a suitable liner fitting therein, and expand the liner and the pipe radially by interior pressure applied thereto and also bend them lengthwise as a unit about the center of the curvature of the desired elbow, thereby assuring accurate and tight fit of the liner within the elbow so that the outer wall of the elbow effectively backs the interior liner and the latter has sealing contact with the inner surface of the outer wall of the elbow.

In the drawings:

Figure 1 is a fragmentary lengthwise sectional view of a length of pipe and a liner therein, showing the relative wall thicknesses of the liner and the pipe;

Figure 2 is a lengthwise sectional view through a portion of the pipe and the liner of Figure 1 being moved over a curved interior expanding mandrel, shown in elevation, illustrating the manner in which the liner and the pipe are expanded radially and are bent lengthwise into desired curvature, this view being on a reduced scale relative to Figure 1 and the liner being shown as of increased wall thickness relative to the wall thickess of the pipe for clearness of illustration; and Figure 3 is a central lengthwise sectional view of a lined elbow produced in accordance with my invention, on an enlarged scale and taken in the plane of the curve thereof.

The first step in the method of my invention consists in providing a liner 4 of proper size to fit snugly within a straight cylindrical pipe 5, which is to provide the outer wall of the elbow. The liner 4 is of a different metal than, or a metal dissimilar to, the metal of the pipe 5. For example, liner 4 may be of stainless steel, copper, or other suitable metal or alloy resistant to the materials to be processed, and the pipe 5 may be formed of wrought iron, ordinary steel, or other suitable metal capable of resisting the stresses to which it may be subjected. Ordinarily, the wall thickness of the liner 4 should be about one-third of the wall thickness of the pipe 5, as shown in Figure 1, but it will be understood that the ratio of the wall thickness of the liner to that of the pipe may vary considerably, depending upon conditions. Likewise, the wall thickness of the pipe may vary considerably, depending upon the diameter of the elbow to be produced and other factors.

After the liner 4 has been properly inserted into the pipe 5, the latter and the liner, as a unit, are expanded radially to the desired diameter, and are bent lengthwise to the desired curvature, by relative endwise movement between liner 4 and pipe 5 as a unit and an interior curved expanding mandrel 6. This mandrel 6 comprises an inner straight cylindrical portion 7 of uniform diameter, an intermediate portion 8 merging at its inner end into the outer end of portion 7 and of increasing diameter outward, and an outer portion 9 of uniform diameter the same as the interior diameter of the desired bend, this outer portion 9 merging at its inner end into the outer end of intermediate portion 8 and being curved about a center corresponding to the center of curvature of the desired bend. If desired, instead of the mandrel 6, any other suitable mandrel may be used; for example, the mandrel disclosed in the patent to James Hall Taylor, No. 2,181,384.

The liner 4 is of an interior diameter to fit snugly over inner portion 7 of the mandrel 6, and the pipe 5 and the liner 4 are expanded radially and bent lengthwise to desired curvature by relative lengthwise movement between pipe 5 and liner 4, as a unit, and mandrel 6. That may be accomplished by moving the pipe 5 and liner 4 lengthwise toward the mandrel while the latter remains stationary, by moving the mandrel lengthwise through the pipe 5 and liner 4 as a unit while they are held stationary, or by imparting lengthwise movement in opposite directions to the mandrel and to the pipe 5 and liner 4. It will be assumed, for purpose of description, that the mandrel 6 remains stationary while the pipe 5 and liner 4 are moved as a unit thereover.

The end portion of the pipe and liner unit, comprising the pipe 5 and liner 4, is first positioned about straight portion 7 of mandrel 6, and is heated in a known manner and by suitable known means to proper working temperature. The pipe and liner unit is then fed lengthwise over the mandrel and, in the area thereof, is maintained at proper working temperature. As the pipe and liner unit advances along the mandrel, it is expanded radially thereby and, as it approaches the outer end of the mandrel, is bent lengthwise thereby to the desired curvature, having previously been bent lengthwise to approximately that curvature in its passage over the intermediate portion of the mandrel. The radial expansion and lengthwise bending of the pipe and liner unit causes thinning of the walls thereof, as shown in Figure 2, and since the radial expansion is produced by pressure applied to the inner surface of the liner, the liner is forced tightly into contact with the inner surface of the pipe so as to fit accurately therein and provide a substantially fluid-tight seal therewith.

After the pipe and liner unit has been expanded and formed to the desired curvature, as above, it is cut to proper length to produce the desired bend, such as the elbow of Figure 3, from which it will be noted that the wall thickness of the liner 4a is approximately one-fifth the wall thickness of the outer wall 5a of the elbow, originally the wall of the pipe. In general, the liner 4a of the elbow may be quite thin relative to the outer wall 5a thereof, its main function being that of a protective inner coating or lining. The ultimate thickness of the lining of the elbow depends upon the wall thickness of the original liner, and by using liners of different wall thicknesses the lining of the elbow produced may be of any desired wall thickness, within reasonable limits. If the elbow or bend is to be welded in a line of pipe, the end portions of the outer wall 5a thereof are removed for a suitable distance, as at 5b, so that the ends 4b of liner 4a project a short distance outward beyond the ends of wall 5a. The bend thus formed is intended for use with lined pipe having the end portions of the outer walls thereof removed in a similar manner, as will be understood. When the bend is properly assembled with the pipe ends, for welding, each end of the bend defines with the adjacent pipe end a welding trough closed at its bottom by the endwise abutting projecting end portions of the liners, which facilitates the welding operation and guards against objectionable entry of molten metal into the pipe with resultant formation therein of "icicles."

I claim:

1. The method of producing lined pipe bends, which comprises inserting into a metal pipe a liner of dissimilar metal, simultaneously and progressively expanding said pipe and liner radially by internal pressure whereby said liner is forced into intimate contact with the inner surface of the expanded pipe, and forming said pipe and liner as a unit about a center corresponding to the center of curvature of the desired bend simultaneously with said radial expansion thereof.

2. The method of producing lined pipe bends, which comprises inserting into a metal pipe a liner of dissimilar metal, and expanding said pipe and liner radially while simultaneously forming them lengthwise to the curvature of the desired bend, by relative lengthwise movement between said pipe and liner as a unit and an interior curved mandrel.

STANLEY ROBAUS.

REFERENCES CITED

The following references are of record in the file of this patent:

UNITED STATES PATENTS

| Number | Name | Date |
|--------|------|------|
| 2,263,714 | Bloomfield | Nov. 25, 1941 |
| 1,951,334 | Bohling | Mar. 20, 1934 |
| 2,181,384 | Taylor | Nov. 28, 1939 |